United States Patent [19]

Ham

[11] 3,789,300

[45] Jan. 29, 1974

[54] DEMAND METER WITH SELF-ALIGNING BEARING ASSEMBLY

[75] Inventor: Donald M. Ham, Rochester, N.H.

[73] Assignee: General Electric Company, Pittsfield, Mass.

[22] Filed: Apr. 21, 1972

[21] Appl. No.: 246,458

[52] U.S. Cl. .............................. 324/103 R, 308/15
[51] Int. Cl. ............................................ G01r 19/16
[58] Field of Search.............. 324/103 R; 308/15, 22

[56] References Cited
UNITED STATES PATENTS
2,147,895   2/1939   Hamill............................ 324/103 R
2,313,908   3/1943   Adams........................... 324/103 R Primary Examiner—Gerard R. Strecker
Assistant Examiner—Ernest F. Karlsen
Attorney, Agent, or Firm—Volker R. Ulbrich; Francis X. Doyle

[57] ABSTRACT

A self-aligning bearing assembly comprising a rigidly mounted bearing having a bushing sleeve pivotally mounted within a small-diameter orifice of a passageway through the bearing. The small-diameter orifice is formed by a thin lip portion of the bearing and the mounting arrangement between the bushing sleeve and the bearing comprises a plurality of fulcrum points about which the bushing sleeve is pivotal, within a limited range, thereby to enable it to be moved into axial alignment with a rotatable shaft member that is adapted to be inserted into the bushing sleeve. The other end of the rotatable shaft member is normally supported in a fixed position with respect to the rigidly mounted bearing by a supporting frame; accordingly, pivotal movement of the bushing sleeve affords a self-aligning capability between the end of the shaft that is fixed against radial movement and the rigidly supported bearing.

1 Claim, 4 Drawing Figures

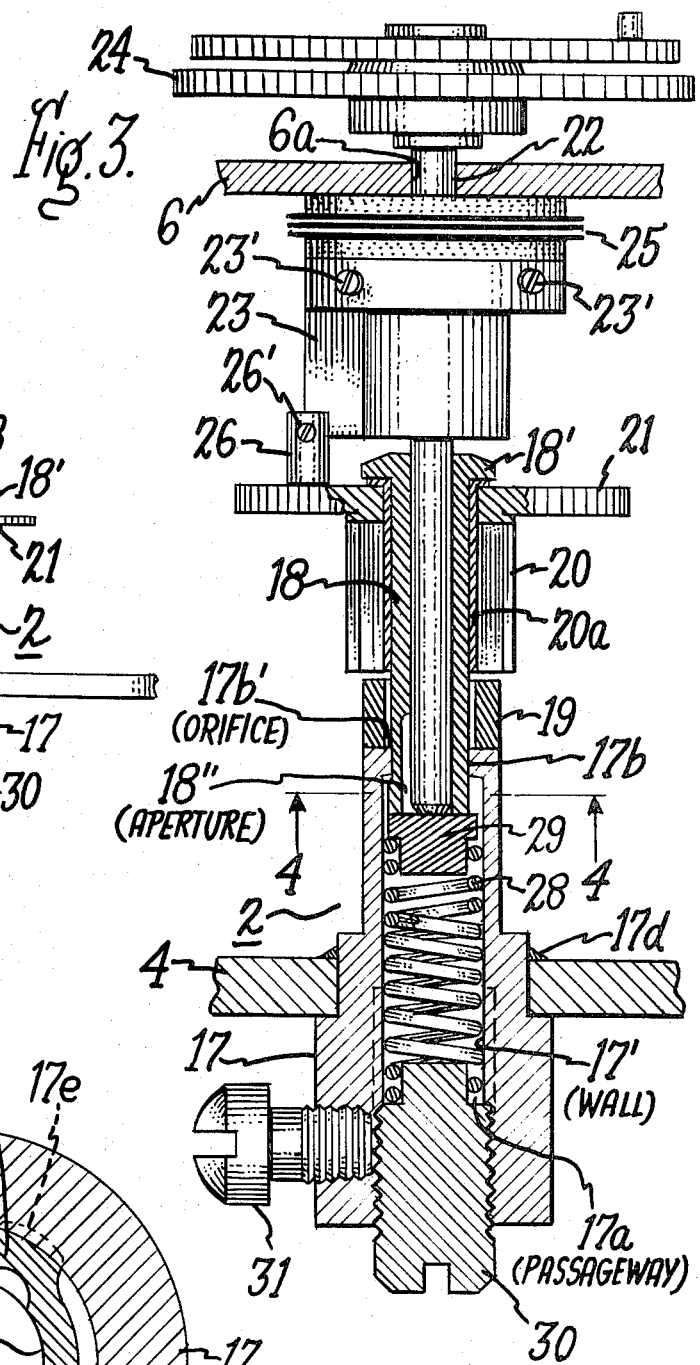

DEMAND METER WITH SELF-ALIGNING BEARING ASSEMBLY

BACKGROUND OF THE INVENTION

The present invention relates to bearing mounting means that are operable to readily provide an accurate self-alignment between a shaft-supporting bushing mounted in a bearing and a rotatable shaft that is to be positioned within, and supported by, the bushing. The invention has been found to be particularly suitable for application in an electric demand meter to provide an inexpensive, precision alignment means between a rotatable pusher member of such a meter and a lever arm that is adapted to be rotated by the pusher member as part of an indicating pointer driving sequence of operation.

The use of various types of pointer-pusher assemblies in electric demand meters is well known in the prior art. Such assemblies are typically employed in an interval timing mechanism of such meters. An example of a typical pointer-pusher mechanism is disclosed in U.S. Pat. No. 3,586,974 which issued on June 22, 1971 and is entitled "Reset Mechanism for a Cumulative Demand Register." That patent is assigned to the same assignee as the present invention.

It is common practice in the assembly of such prior art types of pointer-pusher mechanisms to mount a disc gear that carries a pusher member in axial alignment with a lever arm that is positioned to be engaged and rotated by the pusher member. Of course, since the pusher member is relatively rotatable with respect to the lever arm, these two rotatable components must be supported on at least some separate bearing means. Eccentricity, or mis-alignment between these two bearing means, could introduce a non-linearity error in an electric demand measurement indicated by the rotation of such a separately supported lever arm, as that movement is translated through a cumulative gear train to a dial register, therefore, it has long been recognized that the axis of rotation of the pusher member should be as nearly in alignment with the axis of rotation of the lever arm as possible. In prior art pointer-pusher mechanisms an acceptable alignment tolerance between the respective axes of rotation of these two components of the indicating pointer-pusher mechanism in demand meters was usually attained by manually adjusting the position of the bearing support mounting means for the pusher member, while visually aligning the axis of the rigidly mounted bearing on it with the axis of rotation of the lever arm, and its fixed bearing. Although such manual adjustments resulted in a suitable alignment of the respective axes of rotation of the pusher member and the rotatable lever arm, it has always proven to be a relatively expensive and time-consuming step in the manufacture of high quality demand meters. Moreover, the degree of eccentricity present between the respective axes of rotation of the pusher member and the rotatable lever arm in such meters was necessarily determined by the skill of the operator performing this manual adjustment.

From the foregoing discussion, it is apparent that it would be desirable to provide a self-aligning bearing assembly that would make it possible to quickly and accurately align a pointer-pusher member of a demand meter with a rotatable lever arm that is actuated by it. Therefore, it is a primary object of the present invention to provide an improved self-aligning bearing assembly that is effective to afford accurate and economically attainable alignment between the respective axes of rotation of two relatively rotatable members.

Another object of the invention is to provide a self-aligning bearing assembly that is economical to manufacture and that affords a precision bearing mounting means.

Yet another object of the invention is to provide a pointer-pusher assembly for an electric watthour demand meter in which the degree of eccentricity between a rotatably mounted pointer-pusher and a cooperating lever arm is determined by the structural tolerances of a bearing assembly, rather than solely by a manual adjustment of the bearing mounting means that supports the pointer-pusher assembly.

Additional objects and advantages of the invention will become apparent to those skilled in the art from the description of it that follows, taken in connection with the accompanying drawings.

SUMMARY OF THE INVENTION

In one preferred embodiment of the invention, a pair of relatively rigid plate members are mounted in fixed relation with respect to one another and a generally cylindrical bearing member is mounted in fixed position on one of the plate members. A lever arm supporting shaft is rotatably mounted in a fixed bearing in the other plate member. A sleeve bushing is pivotally mounted within a narrow lip portion of the bearing member in a manner such that a plurality of fulcrum points are established between the bushing sleeve and the bearing member. Thus, the bushing sleeve is adapted to pivot within a limited range of movement about these fulcrum points so that the sleeve can be readily moved into alignment with the longitudinal axis of the shaft that is rotatably mounted in the other plate member. During the assembly of the mechanism, the bushing sleeve is pivoted to a position where it can receive the shaft within its central bore. This movement can either be accomplished by mechanically forcing the shaft into the sleeve bore, or by utilizing a separate tool to move the bushing sleeve into alignment with the shaft. A pointer-pusher member is mounted for rotation on the bushing sleeve and this pointer-pusher member is positioned to engage the lever arm supported by the shaft when the shaft is inserted into the bushing sleeve. Therefore, the degree of eccentricity between the axis of rotation of the lever arm and the axis of rotation of the pointer-pusher member is determined by the mechanical tolerance between the shaft and the inner diameter of the bushing sleeve, rather than being determined solely by a manual adjustment of the two plate members in order to bring the bearing member and the fixed bearing of the shaft into alignment.

BRIEF DESCRIPTION OF THE DRAWINGS

FIG. 2 is a fragmentary, bottom schematic view, in enlarged scale, of the self-aligning bearing assembly illustrated in FIG. 1.

FIG. 3 is a bottom schematic view, partly in cross section, and in enlarged scale, of the self-aligning bearing assembly shown in FIG. 1, illustrated with respect to part of the cumulative gear train of the demand register illustrated in FIG. 1.

FIG. 4 is a cross sectional view, taken along the plane 4—4 in FIG. 3, showing a further enlargement of the structural detail of the self-aligning bearing assembly illustrated in FIG. 3.

DESCRIPTION OF THE PREFERRED EMBODIMENT

Figure 1:
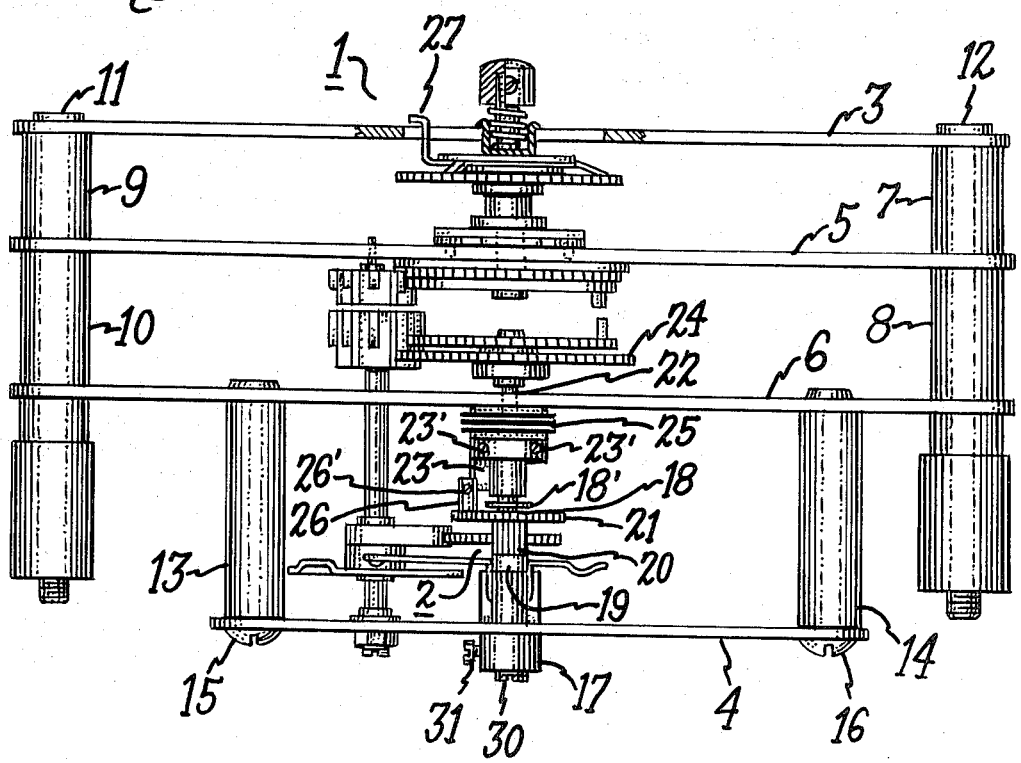
FIG. 1 is a fragmentary, schematic bottom view of an electric demand meter register showing a self-aligning bearing assembly that is constructed pursuant to the teaching of the present invention.

In order to facilitate an understanding of the unique advantages afforded by my invention, the preferred embodiment of it that is disclosed herein is described in the context of an electric demand meter; however, it should be readily apparent that the self-aligning bearing assembly of the invention will also be applicable in other devices. It is not necessary to fully understand the operation of a demand meter in order to comprehend the novel features of the present invention. Therefore, only those components of the demand register 1, shown in FIG. 1, which are closely related to the self-aligning bearing assembly 2 of the invention will be discussed in detail herein. However, if the reader desires to gain a better appreciation of the orientation of the bearing assembly 2 with respect to an interval timing mechanism of a demand register, such as register 1, reference may be made either to the above-mentioned U.S. Letters Patent, or to copending United States Letters Patent Application Ser. No. 241,709 (Docket 5D3816 — Ham), which was filed on Apr. 6, 1972 and is entitled "Indicator Drive and Positive-Zero Reset Mechanism for a Demand Meter." This application is assigned to the same assigned as is the present invention.

As illustrated in FIG. 1, the parts of a demand register 1 that are depicted comprise a dial plate 3, a back plate 4, a first intermediate plate 5 and a second intermediate plate 6. These plates are formed of steel or other suitably rigid material, as is well known in the demand meter art. The plates 3, 5 and 6 are supported in spaced relationship by spacing sleeves 7, 8, 9 and 10, which are secured in fixed position by bolts 11 and 12 on another frame member (not shown) when the register is assembled in operating position in a demand meter. In a somewhat similar manner, the back plate 4 is mounted in relatively fixed position with respect to the second intermediate plate 6 by a pair of spacing sleeves 13 and 14 which are secured in position, respectively, by screws 15 and 16, which are staked to the intermediate plate 6.

Those familiar with demand registers will recognize that the register 1 depicted in FIG. 1 is merely a skeleton, or mounting frame, with only a few of the normal gear trains shown. This illustration is sufficient to teach the present invention, and explain the orientation of a preferred embodiment in a demand register; particularly when the components of register 1 are studied in light of the detailed explanation of a demand register that is given in the above-referenced patent application.

In general, the self-aligning bearing assembly 2 of the preferred embodiment of the invention comprises an elongated bearing 17 that is staked to, or otherwise rigidly mounted on, a support member, which in this case is the back plate 4, and an elongated bushing sleeve 18 (also see FIGS. 2 and 3). The novel features of these bearing assembly components will be discussed in further detail with reference to FIGS. 2-4, however, at this point other components of the preferred embodiment of the invention should be noted. As seen in FIG. 1, the self-aligning bearing assembly 2 also includes a hollow, cylindrically-shaped spacer 19 and a combination pinion gear 20 and disc gear 21 which are mounted in fixed relation to one another on a bearing sleeve 20a, which is rotatably mounted on the bushing sleeve 18. As best seen in FIG. 3, the bushing sleeve 18 has an integral flange 18' formed on its outer end. It will be understood from the following description, that the sleeve 18 is secured against rotation or axial movement within the bearing 17, and the flange 18' thus is effective to restrict axial movement of the gears 20 and 21, as they rotate on sleeve 18.

The bearing 17 is rigidly mounted to plate 4 by being staked (17d) in position on it, as best seen in FIG. 3. In approximately coaxial alignment with the longitudinal axis of bearing 17, a rotatable shaft 22 is inserted through an aperture 6a defined by suitable wall means through second intermediate plate 6. The walls of aperture 6a are formed to secure the shaft 22 against radial movement. The other end of shaft 22 is rotatably mounted in the bushing sleeve 18. A lever arm 23 is affixed to the shaft 22 with one or more set screws 23' mounted in a flange portion of the lever arm, so that it rotates with the shaft 22. A first gear 24 of a cumulative gear train of the demand register 1 is staked, or otherwise suitably mounted in fixed position on the outer end of the shaft 22, and a plurality of Textolite bearing discs 25 are compressed between the circular flange of lever arm 23 and the intermediate plate 6 in a manner that will be more fully explained below. Finally, as is also shown in FIG. 3, a pusher member 26 is mounted on the disc gear 21 at a point spaced radially outward from the axis of rotation of the gear. As is conventional in such demand meter mechanisms, the lever arm 23 is operable to be engaged by an adjustable screw 26' on pusher member 26, so that it is rotated in response to rotation of the pusher member, thereby to drive a demand indicating pointer 27 (see FIG. 1) in an up-scale direction in any suitable conventional manner, such as by means of a gear train like that disclosed in the above-referenced patent application.

Referring now to FIG. 3 of the drawing, it can be seen that in its normal assembled position the shaft 22 is biased so that the circular flange portion of lever arm member 23 is compressed against the bearing discs 25. This biasing action is accomplished by a compression spring 28 bearing against a reciprocal plug 29 and an adjustable screw stop 30 that is secured in position by mating threads in the bearing 17 and by a set screw 31. Thus, the force of friction of the Textolite bearing discs 25 on the disc flange portion of lever arm 23 can be adjusted by positioning screw 30 to vary the tension on spring 28 for any desired degree of friction drag.

Now that the general orientation of the self-aligning bearing assembly 2, in its preferred embodiment, has been described, reference will be made to FIGS. 3 and 4 of the drawing to more fully describe some of the unique features of the invention. As seen in FIG. 3, the bearing 17 includes wall means 17' that define a passageway 17a axially through it. More particularly, the wall means 17' include a lip portion 17b that defines a minimum-diameter orifice 17b' in the passageway 17a. In this embodiment of the invention, both the passageway 17a and the orifice 17b' are cylindrical in shape.

Pursuant to the present invention, the bushing sleeve 18 is secured by a "force fit" within the orifice 17b' by a plurality of bosses 18a, 18b and 18c (see FIG. 4), which are formed integrally in the sleeve 18. As used herein, the term "force fit" does not mean that the sleeve 18 is initially forced into the orifice 17b', but rather it means that after sleeve 18 is in orifice 17b' the walls of sleeve 18 are forced into engagement with the walls of orifice 17b, in a manner that will be described below. The bosses 18a, 18b and 18c are positioned, respectively, in a plurality of detents 17d, 17e and 17f formed in the middle of lip portion 17b. Each of these detents 17d, 17e and 17f at least partially surrounds the respective bosses 18a, 18b and 18c thereby to afford a plurality of sockets in which each of the bosses can be moved pivotally. At the same time, it will be appreciated that this "force fit" engagement between the bosses 18a–c and the detents 17d–f is effective to prevent the bushing sleeve 18 from rotating with respect to the bearing 17, and is further effective to prevent the sleeve 18 from being moved axially with respect to the bearing 17.

It should also be recognized that various methods may be used to attain equivalent "force fit" relationships between the bushing sleeve 18 and the lip portion 17b of bearing 17. Moreover, although a plurality of detents 17d–f are present in the preferred embodiment of the invention, in alternative embodiments of the invention a suitable "force fit" engagement between the bushing sleeve 18 and a cooperating lip portion 17b may be attained without the use of any detents in the lip portion. For example, the lip portion 17b could be cylindrical and bosses 18a–c could be extruded against it as will be more fully explained below.

In order to provide a more detailed understanding of the preferred embodiment of the invention, as it is shown in context with a pointer-pusher mechanism for a demand meter, it should be understood that in this embodiment of the invention the sleeve bushing 18 and the bearing 17 are both formed of brass. Moreover, during the assembly of the self-aligning bearing assembly 2 the bushing sleeve 18 is inserted into the orifice 17b' then a mandrel-type, three-pronged punch is inserted into the shaft-receiving bore of the sleeve 18 (prior to insertion of the shaft 22) and the bosses 18a, 18b and 18c are formed by forcing the walls of sleeve 18 outward to extrude the bosses 18a–c into engagement with the lip portion 17b. This operation also serves to form detents 17d–f in bearing 17, when bearing 17 is formed of brass. In other forms of the invention, in which bearing 17 may be formed of a harder metal, no detents would be formed in the bearing 17. Next, a manual force is applied to move the sleeve 18 pivotally with respect to the bearing 17 so that the metal of bosses 18a–c is caused to flow slightly to free the bearing sleeve 18 so it is operable to pivot about the points of engagement or fulcrums that are thus established between the bosses 18a–c and the lip portion 17b of the passageway 17a. Therefore, it will be apparent that when the back plate 4 (see FIG. 1) is moved into assembled position with respect to the intermediate plate 6, the shaft 22 can be easily inserted into the shaft-receiving aperture 18'' of bushing sleeve 18, so the sleeve 18 will easily pivot about the bosses 18a–c and accurately align itself with the shaft 22.

It should be understood that although three bosses 18a–18c are shown in the preferred embodiment of the invention, a greater or lesser number of bosses may be usd in alternative forms of the invention. In this regard, it should be remembered that it is desirable to center the sleeve 18 in bearing 17; accordingly, if a lesser number of bosses is utilized, they should be of sufficient arcuate extent to assure that result.

Also, it will be appreciated that whereas the passageway 17a through bearing 17 is generally cylindrical in form and uniform in diameter in the preferred embodiment of the invention illustrated herein, other configurations of the bearing 17 may be used in alternative embodiments of the invention. However, it will be noted that the degree of pivotal movement of sleeve 18 is determined by the thickness of lip portion 17b and possibly by the diameter of passageway 17a. Thus, in the preferred embodiment described herein, the diameter of passageway 17a is maintained approximately equal to the combined length of the diameter of the orifice 17b' and the axial width of the lip portion 17b. By way of example, in the preferred embodiment described herein, the unextruded outside diameter of sleeve 18 is 0.0880 inches and the lip portion 17b has an axial width of 0.03 inches, with tolerances of approximately ±0.0005 inches. Moreover, in this embodiment of the invention, the metal walls of bushing sleeve 18 are substantially uniform in thickness throughout, including through the wall portions thereof comprising the bosses 18a, 18b and 18c. Of course, in other embodiments of the invention, wherein no detents such as detents 17d, 17e and 17f are formed in the lip portion 17b, it will be appreciated that the thickness of the wall portions forming the "force fitted" bosses 18a–c may vary from the thickness of the wall portions of the remainder of bushing sleeve 18.

Finally, in the preferred embodiment of the invention described herein, it should be understood that sufficient free space must be provided between the surface of flange 18' which abuts gear 21 and the surface of lip portion 17b which abuts spacer 19 to afford the desired degree of pivotal movement of the bushing sleeve 18. In the preferred form of the invention, this spacing is provided by placing a shim between the spacer 19 and pinion gear 20 during the "force fit" assembly of the sleeve 18 in lip portion 17b, so that at least four-thousandths of an inch of free space is maintained between spacer 19 and gear 20 after the shim is removed. In other words, the combined axial length of the spacer 19 and the combined gears 20 and 21 are at least four-thousandths of an inch less than the distance between the end of bearing 17 that abuts the spacer 19 and the end of flange 18' that abuts the gear 21, in this embodiment of the invention. Also in this embodiment each of the bosses 18a, 18b and 18c has a minimum height, as measured radially outward from the surface of the bushing sleeve 18, of five-ten thousandths (0.0005) of an inch. This dimension serves to space the fulcrums about which the sleeve 18 pivots at least five-ten thousandths of an inch from the surface of the sleeve 18, so that adequate pivotal movement of the sleeve 18 is assured to accommodate normal manufacturing and assembling tolerances of the plates 4 and 6 and the bearing 17 and aperture 6a positioned, respectively, thereon.

Those skilled in the art will appreciate that various modifications and alternative embodiments of the invention may be made from the description of it that is given above. Accordingly, it is my intent to define the true spirit and scope of the invention in the following claims.

I claim:

1. In an electric demand register (1) having a plurality of generally flat metal frame plates (3, 4, 5 & 6) rigidly mounted in spaced-apart approximately parallel relationship, the improvement comprising an interval timing mechanism having a pusher member (26) rotatably mounted on a bearing (17) fixed to one of said plates and having a rotatably mounted lever arm (23) that is supported by a shaft (22) one end of which is secured against radial movement by another of said plates, in which said mechanism includes a self-aligning bearing assembly (2) comprising an elongated bearing (17) rigidly mounted on a support member (4), wall means (17') defining a passageway (17a) axially through said bearing, said wall means being formed to include a lip portion (17b) that defines a thin-walled, minimum diameter orifice (17b') in said passageway, a bushing sleeve (18) positioned through said orifice, fulcrum means (18a–c) formed on said bushing sleeve, said fulcrum means being positioned in pivotal engagement with the lip portion of said passageway thereby to center the bushing sleeve in said orifice and prevent the sleeve from rotating with respect to the bearing, wall means defining a shaft-receiving bore through said bearing sleeve, said bore being arranged to rotatably support said shaft (22) therein, said bushing sleeve being operable to pivot about the points of engagement between said fulcrum means and the lip portion of said bushing thereby to enable the shaft-receiving bore in said bushing sleeve to be moved into alignment with the shaft mounted in it.

* * * * *